United States Patent [19]

Arnstein

[11] 4,118,738
[45] Oct. 3, 1978

[54] TIME BASE ERROR CORRECTOR

[75] Inventor: Walter Arnstein, San Jose, Calif.

[73] Assignee: American Videonetics, Sunnyvale, Calif.

[21] Appl. No.: 804,725

[22] Filed: Jun. 8, 1977

Related U.S. Application Data

[63] Continuation of Ser. No. 618,624, Oct. 1, 1975, abandoned.

[51] Int. Cl.² .................... H04N 5/04; H04N 5/76; H04N 7/00; H04N 5/78
[52] U.S. Cl. ............................ 358/148; 358/8; 358/127; 178/69.1; 360/36; 307/232; 328/164
[58] Field of Search .............. 178/69.1; 358/8, 127, 358/148; 360/36; 307/208, 232; 328/162, 164, 165

[56] References Cited

U.S. PATENT DOCUMENTS

| | | | |
|---|---|---|---|
| 3,419,681 | 12/1968 | Bopp et al. | 358/8 X |
| 3,748,386 | 7/1973 | Monney et al. | 360/36 X |
| 3,763,317 | 10/1973 | Coleman, Jr. et al. | 360/36 |
| 3,860,952 | 1/1975 | Tallant et al. | 358/8 |
| 3,994,013 | 11/1976 | Lennoine et al. | 358/8 |
| 4,054,903 | 10/1977 | Niaomiya | 358/8 |

Primary Examiner—Robert L. Griffin
Assistant Examiner—Aristotelis M. Psitos
Attorney, Agent, or Firm—David B. Harrison

[57] ABSTRACT

A time base error corrector for correcting time base errors in recurrent information such as horizontal lines of a video signal by random selection of a delay line tap is disclosed. Incoming recurrent information groups are converted into impulse trains, in which the information is carried on the leading edges of the impulses, which are passed asynchronously through a delay line of plural cascaded digital gates having propagation delays which provide known tapped increments of delay as well as providing regeneration of each impulse passing therethrough. A digital counter is clocked at a rate corresponding to said delay increments and counts the time base error of a train as it counts down the taps of said line. The total reached in counting the time base error determines the tap through which the impulse train is output from the delay line. A restoration circuit then restores the original signal format to the corrected information group.

20 Claims, 8 Drawing Figures

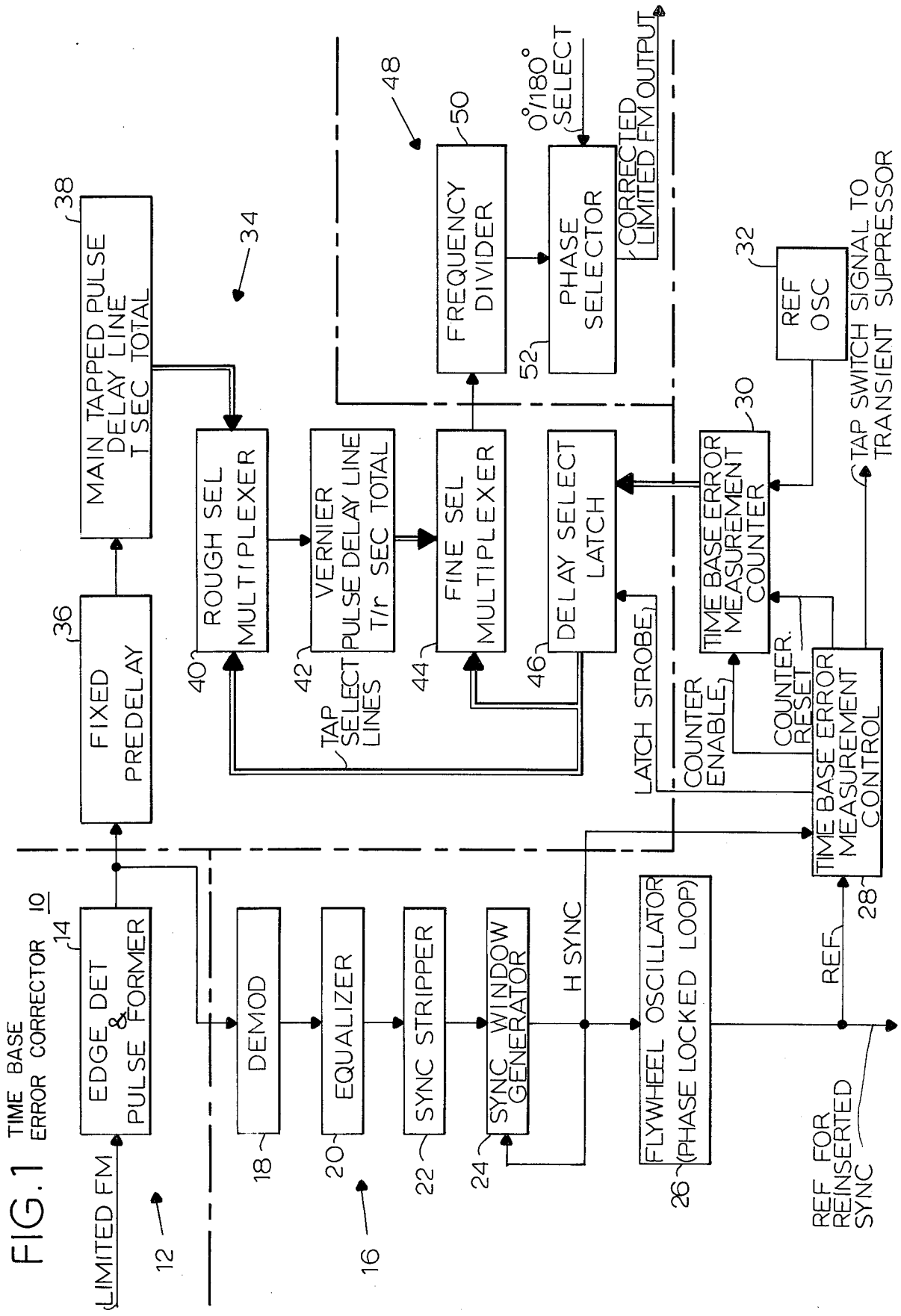
FIG.1 TIME BASE ERROR CORRECTOR 10

TIME BASE ERROR CORRECTOR

This is a continuation, of application Ser. No. 618,624, filed Oct. 1, 1975 and now abandoned.

BACKGROUND OF THE INVENTION

The present invention relates to a system for processing recurrent signals to improve the timing quality thereof. More particularly, it relates to digital apparatus for correcting high speed time base errors that often occur, e.g. in transmission or reproduction of television video signals.

Conventional television broadcasting systems create visual images on a cathode ray tube screen through a process of repetitively scanning at a high rate from left to right and from top to bottom. Such television systems typically utilize 525 vertically displaced horizontal lines (scans) for each complete picture called a "frame" and 30 frames are scanned during each second. During the scanning process for each frame, it is important that each succeeding line start and stop in the same horizontal position as the preceding line so that the vertical edges of the generally rectangular picture are straight and so that the reproduced picture itself is a true image of the scene being televised. To synchronize the scan of the cathode ray tube with the transmitted video signal, a horizontal synchronizing pulse is provided at the beginning of each line and a vertical synchronizing pulse at the beginning of each frame during synchronizing intervals.

The processing of television signals in the aforesaid systems often introduces timing errors between successive lines within a video frame called time base errors. These errors are characterized by successive lines being displaced to the right or to the left relative to preceding lines. Thus, the vertical edges of a television tube picture manifesting time base errors are characteristically wavy or ragged rather than being sharp vertical edges as they should be, and the picture is distorted throughout in the same way as the ragged or wavy edges.

A primary source of time base errors in television systems are video tape recorders when they are functioning in the playback mode. Changes in tape dimensions, relative mislocations among reproduction heads in a rotating head assembly, differences between and uneven wear of reproduction heads, and motor velocity errors may singly or in combination introduce time base errors in the video signals being reproduced. In addition, other conditions and devices are known to introduce time base errors into video signals. Whatever the cause of these time base errors, the result was an unacceptably distorted television picture. Thus, a recognized need arose for an apparatus capable of processing video signals to minimize time base errors.

A number of approaches and techniques were developed to eliminate time base errors. All of the approaches heretofore taken were characterized by the substantial drawbacks of complexity, instability and high cost.

One of the techniques known in the prior art utilized a conventional analog lumped-constant delay line of electrically variable length. That technique processed direct video signals to determine the amount of time base error and then electrically lengthened or shortened the delay line to correct the error. The system required continual adjustments and was very expensive. Also, abrupt changes in delay line length could not be made.

A more recent development in the prior art was disclosed in U.S. Pat. No. 3,860,952 to Tallent et al. That system provided very complex and expensive high speed (10.7 MHz average sampling rate) analog-to-digital hardware for digitizing and storing substantial amounts of a video signal at a clocking rate that varied analogously with the time base errors. The digitized video signal was thereafter withdrawn from storage in multiple shift registers at a standard stable rate and regenerated into video signals free of time base errors. That system was unable to make sudden changes in delay correction and was not able to be used with multiple segmented rotary head video tape recorders.

Another proposed system combined digital and analog techniques to provide time base error correction. Input shift registers were to be employed for sequential loading of sampled analog (direct) video information into a bank of metal oxide semiconductor (MOS) storage cells at an uncorrected rate. Thereafter, output registers were to withdraw the analog video signals at a rate free of time base errors. The complications of that system led to difficulties with implementing hardware.

In view of the foregoing a general object of the present invention is to provide a vastly improved and simplified method and apparatus for correcting time base errors in recurrent groups of pulse trains such as lines of video.

Another object of the present invention is to provide a very high speed digital time base error corrector that utilizes inherent propagation delays in digital circuit elements to provide an asynchronous pulse delay line.

A further object of the present invention is to provide a digital time base error corrector that provides random access to various outputs of the digital delay line with a high speed digital counter which counts the amount of time base error of each information group and simultaneously selects the delay line tap required to correct the error counted.

A still further object of the present invention is to provide effective time base error correction of amplitude limited frequency modulated video signals received as playback directly from video tape or disc recorder.

Yet another object of the present invention is to provide a very stable and reliable time base video error corrector that is inexpensive to manufacture, that is stable and reliable throughout extended use, and that requires little or no periodic maintenance or adjustment.

SUMMARY OF THE INVENTION

The digital time base error corrector of the present invention includes a tapped delay line which may be formed of plural cascaded digital gates having propagation delays providing known increments of delay. A precise reference oscillator generates a digital counting signal, and each count thereof is timed to correspond with an increment of delay between adjacent taps of the line. A high speed digital counter is connected to count the counting signal for an interval for each information group. The counting occurs before the group enters the tapped portion of the delay line. The counting interval is directly related to the time base error of the group, and the count reached is a measurement of the time base error of the group.

As the digital counter counts the time base error of the information group, it simultaneously counts along the taps of the delay line. Thus, when the time base error has been finally counted, the count reached identifies the tap of the delay line which will correct that time base error.

Control circuitry is provided to enable the counter during the counting interval for each group and to select and hold the identified tap until a measured amount of the information group has left the delay line through that tap. Then the corrector switches to the tap selected to correct the time base error of the next information group. This correction process is repeated for each group.

Switching taps introduces a transient into the signal undergoing time base error correction. Thus, it is necessary to time the tap switch so as not to create interference.

Alternatively, the switching transient may be suppressed by blanking techniques after the signal has left the error corrector.

The method of the present invention corrects high speed time base errors in recurrent groups of information by the following steps: asynchronously passing each group into the tapped delay line; digitally counting the time base error of the group before it enters the tapped portion of the delay line; timing each count so that it corresponds to a tap of the delay line; selecting a tap with the count reached; and, outputting the pulse train from the delay line through the digitally selected tap so as to eliminate the time base error of the group and restore its synchronization with the correct time base.

Digital gates are cascaded to form the tapped delay line. The information groups of the incoming signal are converted into inpulse trains wherein the leading edges of the inpulses carry the information. Edge detection circuits are provided at the input and frequency divider circuits at the output of the delay line to provide the impulse trains and restore the original signal format respectively. Pulse reconstituting circuits are provided at regular intervals throughout the line to maintain width and stability of the pulses. Phase reversal circuitry may also be provided at the output.

The time base error corrector of the present invention is particularly well suited for correction of high speed time base errors in horizontal lines of a composite video television signal. As will be recognized by those skilled in the art, however, many other recurrent signals which must be corrected to a time base may be sucessfully processed with the system of this invention.

Other objects, advantages, and features of the invention will become apparent from the following detailed description of a preferred embodiment, presented with the accompanying drawings.

BRIEF DESCRIPTION OF THE DRAWINGS

FIG. 1 is a functional block diagram of a preferred embodiment of the digital time base error corrector system of the present invention wherein the input subsystem, delay control subsystem, digital delay line subsystem, and output subsystem are divided by dashed lines.

DETAILED DESCRIPTION OF A PREFERRED EMBODIMENT

Overall Circuit Configuration

Figure 2A:
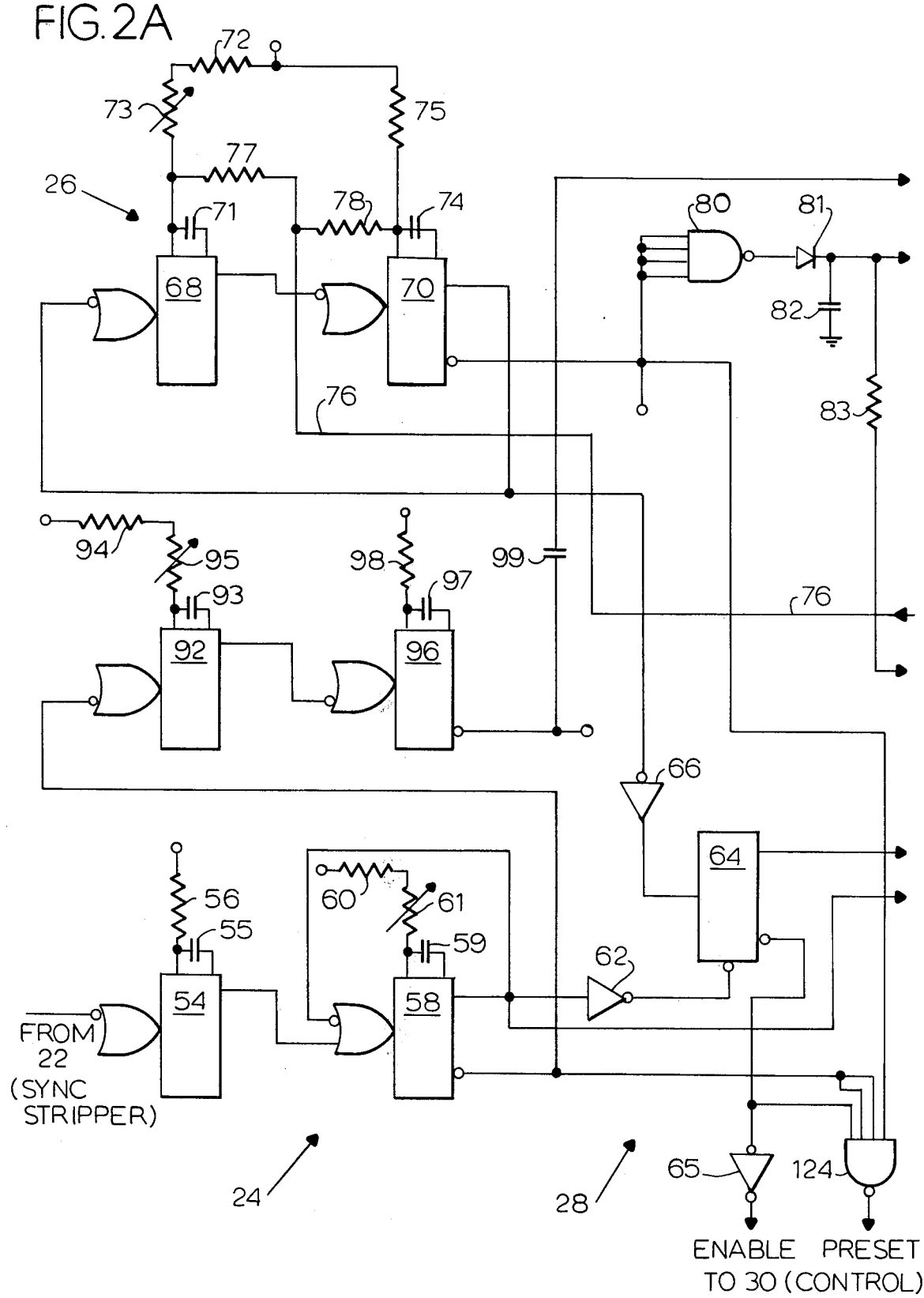
FIGS. 2A and 2B constitute a schematic diagram of the circuit elements of the delay control subsystem of FIG. 1.

A digital time base error corrector constructed in accordance with the principles of the present invention is shown in the block diagram of FIG. 1. The error corrector 10 comprises four subsystems: an input subsystem, a delay control subsystem, a delay line subsystem, and an output subsystem.

The input subsystem 12 provides an edge detector and pulse former 14 which converts an incoming limited FM video line signal into a pulse train of digital pulses of fixed width with a pulse generated at each transition of the limited FM signal.

The delay control subsystem 16 includes eight interconnected circuits: a demodulator 18 connected to the pulse former 14 to recover the direct video signal, an equalizer 20 and sync stripper 22 which separate the synchronizing pulses from the demodulated direct video, and a sync window 24 through which the separated sync pulses are passed to eliminate all but the horizontal sync pulses of the incoming signal. A flywheel oscillator with phase locked loop 26 operates at the horizontal sync rate and is loosely locked to the demodulated incoming horizontal sync to provide an output signal which is an average of the horizontal sync rate. The average horizontal sync rate signal is applied to a time base error measurement control circuit 28 to start the count of a high speed counter 30 which is clocked at 80 MHz by a stable reference oscillator 32. The average horizontal sync rate signal is advanced ahead of the incoming line of video by a time factor equal to one half the delay of the main tapped delay line 38. The actual horizontal sync pulse from the window 24 is applied to the control circuit 28 to stop the counter 30. The counter 30 is also stopped by a logic circuit that senses when the counter is approaching its maximum count. In this way, the error measurement subsystem cannot overflow or recycle.

While the control subsystem 16 has been determining the amount of time base error of the incoming line of video, that line of video has been passing through a fixed predelay circuit 36 of the digital delay line subsystem 34 which delays the video line by the amount of time required by the control subsystem 16. The video line then passes into a main tapped digital delay line 38 and out through a tap selected by a rough tap selection multiplexer 40. The line then enters a vernier digital delay line 42 and leaves through a tap selected by a fine tap selection multiplexer 44. The multiplexers 40 and 44 are connected to a delay tap selector latch 46 which in turn is connected to store the count of the counter 30 when a latch strobe signal is provided by the time base error measurement control circuit 28.

The time base corrected line of video then enters a frequency divider circuit 50 of the output subsystem 48 where the limited FM format is restored. If needed, a phase selector circuit 52 is included to insure that the output signal is of the correct phase.

Each subsystem will now be discussed in greater detail.

INPUT SUBSYSTEM

Figure 6:
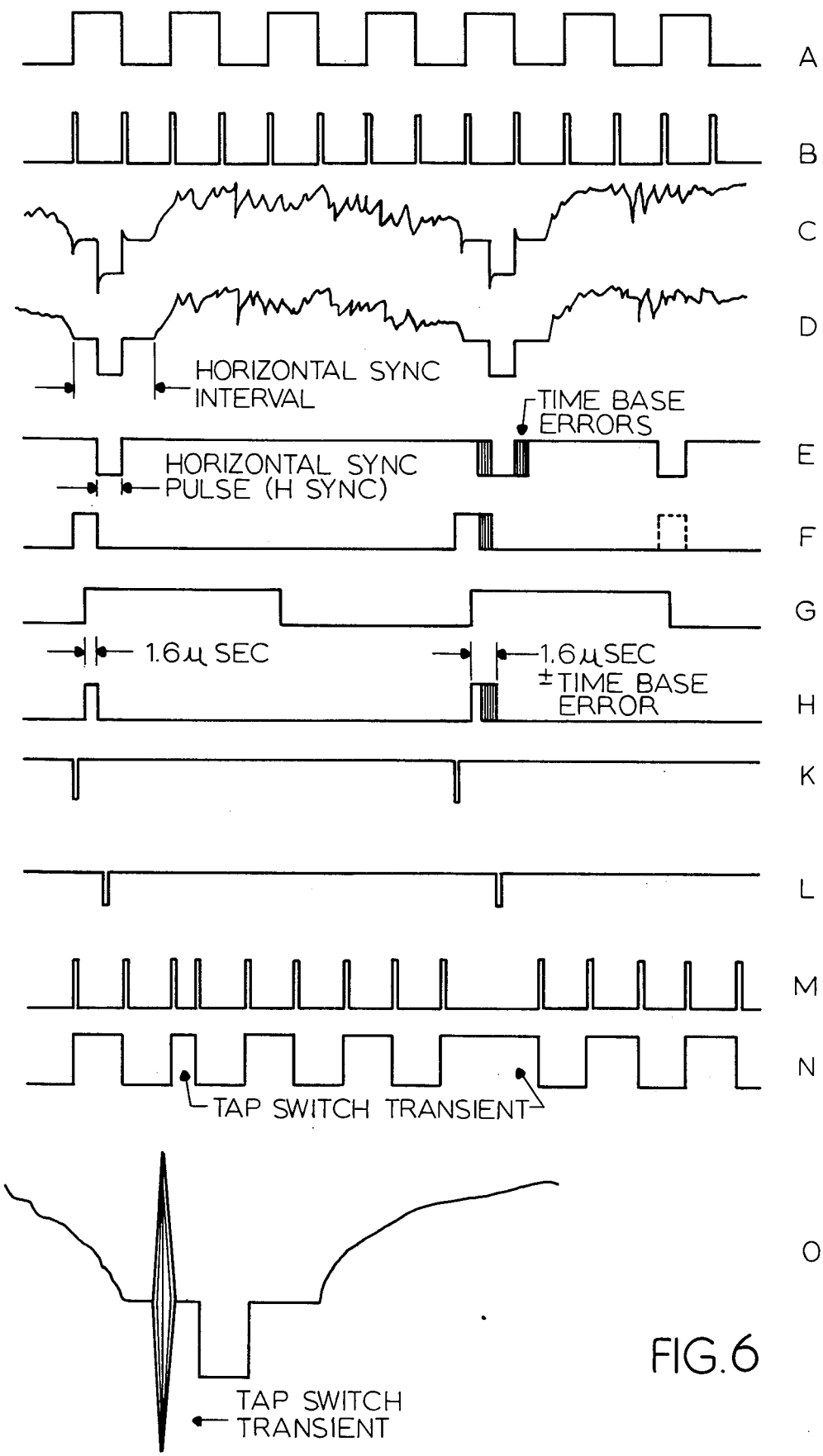
FIG. 6 is a waveform diagram which illustrates operation of the time base error corrector system of FIG. 1.

The input signal to the time base error corrector input subsystem 12 is an amplitude limited frequency modulated video pulse train (shown as waveform A in FIG. 6). This FM video signal is typically provided from the playback electronics subsection of a video tape recorder, although it could be provided from any source of frequency modulated video. If amplitude modulated direct video information is to be processed by this corrector, it is necessary that it first be converted to frequency modulated format. Thus, the input signal at the edge detector and pulse former input subsystem 12 is a pulse train of approximately 50% duty cycle wherein the frequency carries the video signal information. The edge detector and pulse former 14 convert the incoming limited FM pulse train into constant width short duration pulses by differentiating the pulse train so that for each positive or negative transition thereof a positive pulse of approximately 20 nanoseconds in width is produced at the output of the pulse former 14. These pulses are shown as waveform B of FIG. 6. All of the necessary information is carried in the leading edges of these 20 nanosecond pulses, and it is an important consideration in the design of the present system to preserve accurately the relative times of occurrences of these leading edges.

DELAY CONTROL SUBSYSTEM

An output of the edge detector and pulse former 14 is provided to the demodulator circuit 18 at the delay input of the control subsystem 16. The demodulator circuit 18 functions in a well known manner to demodulate the differentiated limited FM pulse train into amplitude modulated direct video information. This direct video signal is shown as waveform C, FIG. 6 which illustrates the overshoot caused by preemphasis. The time scale of waveforms A and B is considerably expanded relative to waveforms C and D. The demodulator 18 may be implemented with any of a number of well known circuits and will not be described in further detail.

The demodulated video signal is then equalized by the equalizer circuit 20 to provide any necessary amplification, deemphasis or other modification of the demodulated signal and render it optimally suitable for detecting and extracting synchronizing information therefrom. The equalized signal output from the equalizer 20 is shown as waveform D, FIG. 6. The circuitry of the equalizer 20 is also well known and further description is of omitted. In combination with the equalizer 20, the sync stripper circuit 22 divides the synchronizing pulses from the picture information to provide an output containing only the video synchronizing pulses. Its output is shown as waveform E of FIG. 6. An equalizing pulse is illustrated in the second horizontal line shown in waveform E. Such equalizing pulses only occur during the vertical sync interval. The stripper circuit 22 is likewise conventional.

The separated sync pulses from the stripper 22 are input to a sync window generator circuit 24 which eliminates all synchronizing pulses except each horizontal line sync pulses occuring at the beginning of each line. The signal produced by the sync window generator circuit is shown as waveform F, FIG. 6. The equalizing pulse which occurs during the vertical interval is shown in dashed lines in waveform F. All equalizing pulses, vertical pulses and most noise pulses are eliminated by the sync window generator 24. The sync window circuit of the present embodiment is shown in FIG. 2A and includes a pulse shaper 54 which receives all sync pulses from the stripper 22 and differentiates them to provide 100 nanosecond output pulses timed to occur at all falling edges of waveform E. The shaper 54 may be a retriggerable monostable multivibrator, e.g. type SN 74123 made by Texas Instruments, Inc., and includes an external timing capacitor 55 and timing resistor 56, the values of both being chosen to provide the 100 nanosecond wide output pulse. The 100 nanosecond pulses occur at the beginning of each horizontal line and, during the vertical interval, also at other points specified by the broadcasting format. As shown by waveform F, FIG. 6, the sync window removes all pulses other than those associated with H sync, i.e. sync information at the beginning of each horizontal line.

The sync window circuit 24 includes a nonretriggered monostable multivibrator 58 which may be the same type as the shaper 54. The multivibrator 58 is wired to receive each 100 nanosecond output pulse from the shaper 54 and generate therefrom a blanking signal of about 58 microseconds width simultaneously with the arrival of each output pulse, thereby excluding from the control system any further sync pulses for that period including the equalizing pulse occurring during the vertical interval. The multivibrator 58 utilizes an external RC timing network made up of a capacitor 59, a fixed resistor 60 and a variable resistor 61 which is adjusted so that the 58 microsecond blanking signal is generated only at the beginning of each 63.5 microsecond interval, which is the time interval of each video line. At the end of this 58 microsecond period, the blanking signal is removed and the control system becomes receptive to the next sync pulse, which should occur in about 5.5 microseconds. This period of receptiveness is referred to as the sync window. With this timing arrangement, the multivibrator 58 generates line sync information (H sync) and excludes all other synchronizing information such as the equalizing pulses previously mentioned (waveform F).

The output of the multivibrator 58 is inverted for delay matching purposes by an inverter 62 before being received by a counter control flip flop 64 as a reset input. The counter control flip flop 64 is a part of the time base error measurement control circuit 28 (shown in FIG. 1) and functions to provide a count enable control signal as its output. This control signal is inverted for load buffering purposes by an inverter 65 before being sent to activate the time base error measurement counter 30. The count enable control signal is shown as waveform H of FIG. 6. The count enable control signal starts when the output signal (waveform G, FIG. 6) from the flywheel oscillator 26 goes through a low-to-high transition, and the control signal stops when the H sync from the sync window generator arrives. The timing relationship is shown by the time relationships of waveforms E, F, G, and H, FIG. 6. Thus, it will now be understood that the inverted output of the multivibrator 58 clears the control flip flop 64 which terminates the count enable control signal.

The clock input to the control flip flop 64 is provided from the output of the flywheel oscillator 26 through an inverter 66. The flywheel oscillator is formed from two interconnected multivibrators 68 and 70 each of which may be the same type as the shaper 54. The output of multivibrator 70 is provided not only to the control flip flop 64 through inverter 66, but it is also provided to the input of multivibrator 68 to provide a feedback path to produce oscillations (multivibrations) at a controlled rate. The output signal from the flywheel oscillator 26 is shown as waveform G, FIG. 6. A timing capacitor 71, fixed resistor 72 and variable resistor 73 are connected to the multivibrator 68, and a timing capacitor 74 and timing resistor 75 are likewise connected to the multivibrator 70. The variable resistor 73 may be adjusted to govern the uncontrolled rate and duty cycle of the flywheel oscillator 26. Repetition rate of the oscillator 26 is also governed by a control voltage on a wire 76 which is applied to both multivibrators 68 and 70 through two equalizing resistors 77 and 78 respectively. The wire 76 comes from the output of phase locked loop circuitry shown in FIG. 2B, which will be explained hereinafter.

Figure 2B:
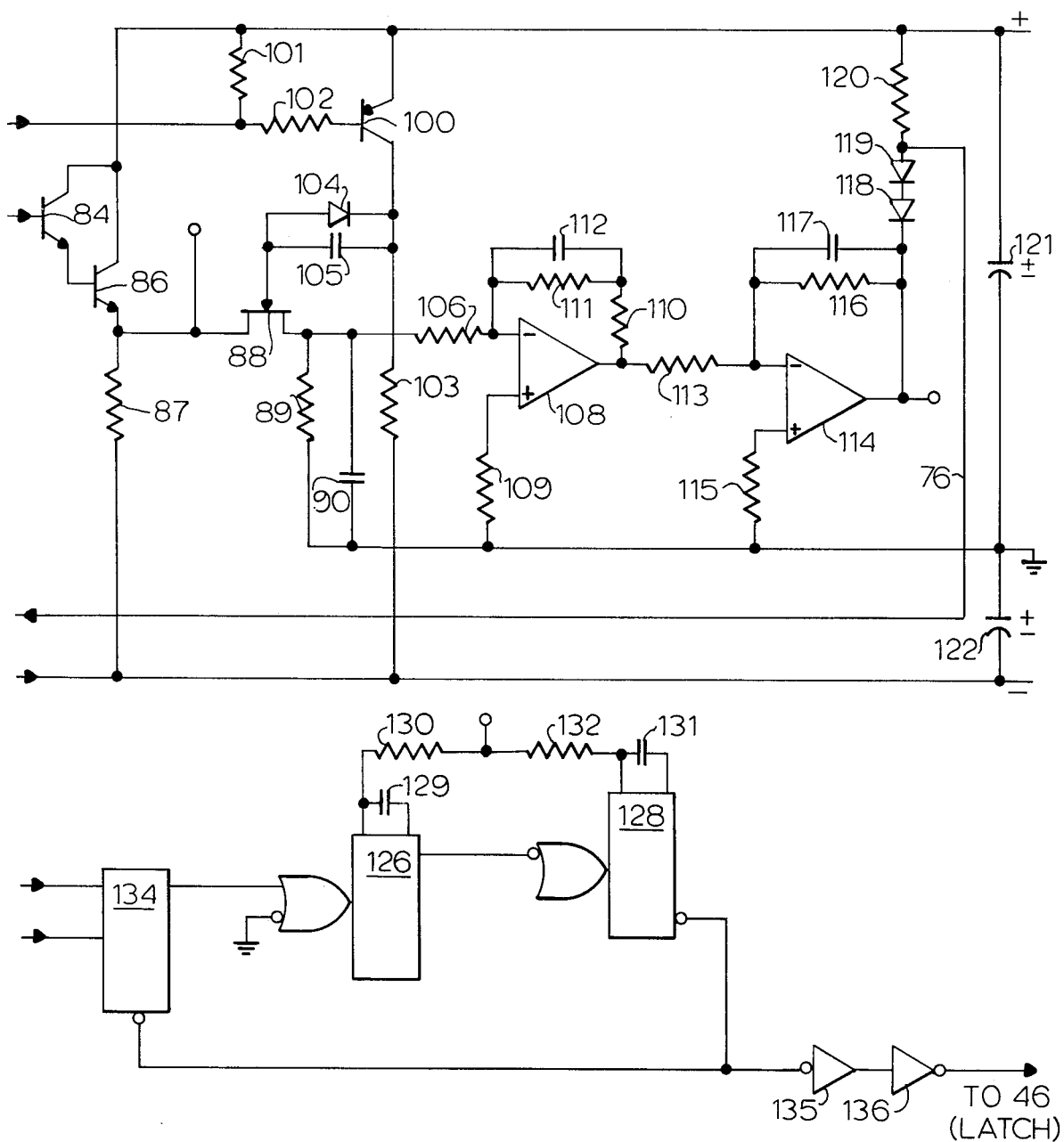

As noted above, the flywheel oscillator 26 is governed to oscillate at the average horizontal line rate. The averaging circuitry used to provide the correction voltage on wire 76 will now be described. An inverted output of the multivibrator 70 is inverted by a buffer/inverter 80. The twice inverter signal is thence applied through a diode 81 to charge a capacitor 82 thereby forming a ramp generator whose time constant is fixed by the parallel resistor 83. The capacitor 82 and resistor 83 are connected to the input of a pair of transistors 84 and 86 connected as an emitter follower Darlington amplifier (FIG. 2B). A load resistor 87 is connected at the emitter of the transistor 86 which is also connected to the source of a very high impedance junction field effect transistor 88. Across the drain of the JFET 88 are a resistor 89 and parallel capacitor 90. At a sample signal applied to the gate of JFET 88, the instantaneous value of the voltage ramp generated at the inverter 80 and amplified by the Darlington pair 84 and 86 can thus be impressed across the capacitor 90 and stored therein, subject only to very slow drain through resistors 89 and 106. For practical purposes, the voltage is updated at such a rate that this circuit constitutes a sample-and-hold circuit.

Incremental phase changes to be made to the ramp function stored in the capacitor 90 are inserted at the gate of the JFET 88 by circuitry now to be described. Referring again to FIG. 2A, horizontal sync (5 microsecond window) is supplied from the inverting output of the multivibrator 58 to the input of a sampling pulse detector 92 which may be a monostable multivibrator, of the same type as the shaper 54. A timing capacitor 93, fixed resistor 94 and variable resistor 95 are connected to the detector 92 to provide an output pulse of a duration varying from about 6 to 15 microseconds. The output of the detector is then input into a pulse shaper 96 with a timing capacitor 97 and resistor 98 chosen for an output pulse duration of 2 microseconds. The pulse shaper 96 may also be the same type as the shaper 54. The output of the pulse shaper is sent through a differentiating capacitor 99 to the base of the PNP transistor switch 100 (see FIG. 2B) through a voltage divider made up of a shunt resistor 101 and a series resistor 102. The collector of the transistor 100 is connected to a load resistor 103 and also to the cathode of a diode 104 and a capacitor 105 shunted across the diode 104. The anode of the diode 104 and other end of the capacitor 105 are connected to the gate of the junction field effect transistor 88. On a signal from the pulse shaper 96 in the form of a negative-going pulse, the transistor switch 100 applies a positive sampling pulse to the gate of JFET 88, transferring the level of the ramp seen at that time on its source to its drain and hence to capacitor 90 where that level can be stored. It is a property of this circuit that if the incoming sync information is on time, with no time base error, the ramp value thus intercepted will be essentially zero. If early, it will be negative, if late it will be positive.

The voltage across the capacitor 90 is directly coupled through a series resistor 106 to the inverting input of an operational amplifier 108 that has its non-inverting input returned to ground through a resistor 109, and that has its gain controlled by a feedback network consisting of a resistor 110 in series with a parallel connected resistor 111 and capacitor 112. The output of the amplifier 108 is directly coupled through a series resistor 113 to the inverting input of a second operational amplifier 114 also having its non-inverting input returned to ground through a series resistor 115 and its gain controlled by a feedback network of a resistor 116 and a capacitor 117. The operational amplifiers may be, e.g. type MC 1458, a dual amplifier made by Motorola Semiconductor, or equivalent.

The output of the amplifier 114, which is a feedback correction voltage, is fed to a DC offset circuit consisting of two series diodes 118 and 119 and thence along the wire 76 to the flywheel oscillator 26 to provide the necessary frequency control for establishing and maintaining phase lock. A pullup resistor 120 is also connected to the wire 76. High value supply voltage decoupling capacitors 121 and 122 are also shown in FIG. 2B.

It is to be understood that the phase locked loop control circuitry is designed to shape the frequency and phase characteristics of the loop in order to average in a stable manner the horizontal sync rate over a substantial number of repetitions so that there is considerable inertia in the flywheel oscillator. In the example shown the primary time constant of the phase locked loop is 0.01 second so that line-to-line errors at rates substantially above 100 Hz are ignored. Only by averaging over a substantial number of repetitions of horizontal synchronizing pulses will the flywheel oscillator be able to change its frequency and phase. In addition to providing this slow averaging, the DC gain, frequency and phase characteristics of the loop are also carefully adjusted to keep it stable and free of spurious response.

If stable horizontal synchronizing pulses of known phase relationship to the incoming video signal are available, then the flywheel oscillator phase locked loop circuit 26 may be omitted and the stable reference H sync used to start the time base error measurement counter 30. Suitable timing circuitry would, of course, be added to advance the reference H sync appropriately ahead of the expected arrival of actual horizontal line sync undergoing correction so that time base error corrections could be made in equal ranges on both sides of the midpoint of the delay line. Also, the source of the video signal would have to be servo-connected to the reference in order to be able to follow it to within the error limits established by the capacity of the time base error corrector.

Before leaving FIGS. 2A and 2B, several circuit elements of the time base error measurement control circuit 2B have yet to be described. A preset gate 124 provides a suitable preset control pulse to the counter 30 to preset its count to zero just before it begins its error measurement. The preset gate 124 may be a four input NAND buffer, e.g. type SN 7440 made by Texas Instruments, Inc. and receives as its input high pulses from the inverted outputs of the control flip flop 64, multivibrator 58, and flywheel oscillator multivibrator 70. The preset output from the gate 124 is a low pulse, shown as waveform K of FIG. 6.

A pulse delay and stretcher circuit made up of two monostable multivibrators 126 and 128 is included in a latch strobe subcircuit of the control circuit 28 to provide a sufficient delay time for the counter 30 to settle at the end of each error measurement interval before its final count is strobed into the delay tap selector latch 46. A timing capacitor 129 and resistor 130 are used with multivibrator 126 and likewise a timing capacitor 131 and resistor 132 are used with multivibrator 128. The multivibrator 126 provides the desired delay for the latch strobe pulse, while multivibrator 128 generates the strobe pulse itself. The timing source for the strobe signal is flip flop 134 which is enabled by the output of the flip flop 64 (indicating the counter is counting) clocked into its "1" state by the output of flip flop 58 (indicating H sync has arrived) and reset by a clear signal from the output of the pulse multivibrator 128. The latch strobe is buffered and further delayed by two inverters 135 and 136 and then sent to the delay tap selector latch 46, shown in FIG. 3. The latch strobe is timed to transfer the count of the counter 30 into the latch 46 coincident with the front porch portion of the horizontal sync interval of the incoming line of video, so that switching transients induced by this transfer may be suppressed without loss of either picture or synchronizing information. The latch strobe control pulse is shown as waveform L of FIG. 6.

Figure 3:
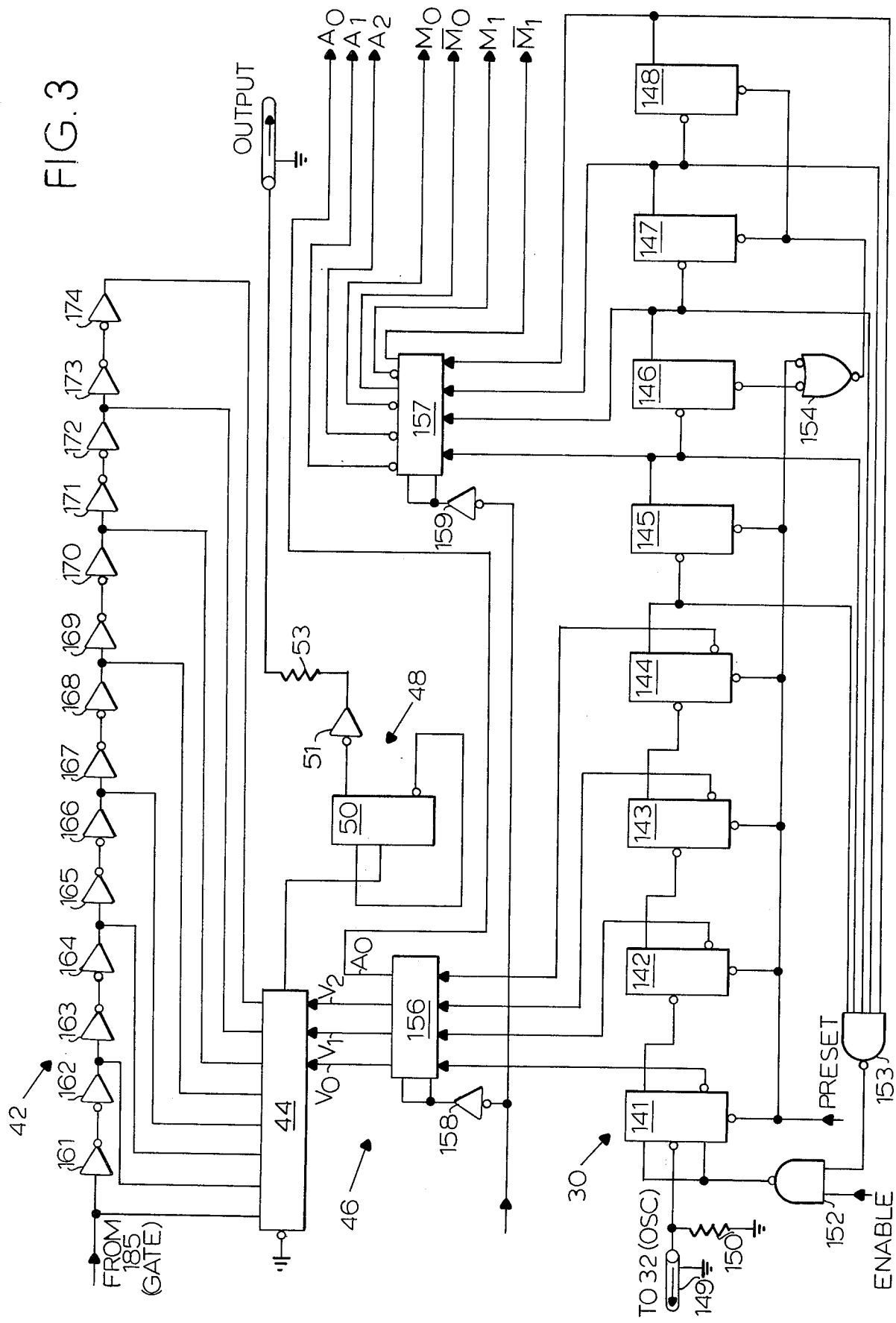
FIG. 3 is a schematic logic symbol diagram of the 100 nanosecond digital vernier delay line circuit of the delay line subsystem of FIG. 1. The high speed counter circuit of the delay control subsystem of FIG. 1 is also shown, along with the frequency divider of the output subsystem.

Referring now to FIG. 3, the time base error measurement counter 30 is illustrated as an 8-bit ripple counter made up of eight parallel flip flops 141, 142, 143, 144, 145, 146, 147, 148. As the clocking frequency applied to the input flip flop 141 is 80 MHz, high speed Schottky devices are used. The flip flops 141 through 148 may be, e.g. type SN 74S113 made by Texas Instruments, Inc. The 80 MHz clock signal is provided from the reference oscillator 32 to the input flip flop 141 via a shielded lead 149. A termination resistor 150 is paralleled across the input for impedance matching. The input flip flop 141 receives the count enable signal from the inverter 65 (FIG. 2A) via a two input AND gate 152. The input to the AND gate 152 comes from an five input positive NAND gate 153, the inputs of which are wired to the outputs of the flip flops 144, 145, 146, 147 and 148. The gate 153 detects the condition when the counter is within 8 counts from its maximum count and functions to disable the counter to prevent overflow. Due to propagation delays, the counting is actually halted very near the maximum count. A gate 154 is placed between the sixth flip flop 146 and seventh flip flop 147 to buffer the counter present pulse which is received at the preset input of the flip flops 141 through 148 from the preset NAND gate 124 (FIG. 2A).

A very stable crystal controlled high frequency oscillator 32 provides the 80 MHz clocking signal for the measurement counter 28. As each tap of the delay line of the present invention is at 12.5 nanosecond intervals, and the counter 30 must function to count with a 12.5 nanosecond interval, the frequency of the reference oscillator 32 will therefore be initially precisely adjusted to 80 megahertz. The oscillator 32 employs conventional principles well known to those skilled in the art.

DIGITAL DELAY LINE SUBSYSTEM 34

Referring to FIG. 3, the eight parallel bit output of the counter 30 is strobed into two four parallel bit latches 156 and 157, each of which may be, e.g. type SN 7475, made by Texas Instruments, Inc. Together, the latches 156 and 157 make up the delay tap selector latch 46. The latch strobe control pulse from the inverter 136 (FIG. 2B) is received into the latch 156 through an inverter 158, and into the latch 157 through a similarly placed inverter 159. Both inverters serve as buffers as well as inverters.

There are ten output lines from the delay tap selector latch 46 with outputs $V_0$, $V_1$, $V_2$ and $A_0$ coming from the latch 156, and outputs $A_1$, $A_2$, $M_0$, $\overline{M_0}$, $M_1$ and $\overline{M_1}$ coming from the latch 157. The outputs $V_0$, $V_1$ and $V_2$, (associated with the counter's three lowest order bits) are received at the fine tap selection multiplexer 44, which in the present embodiment may be a single multiplexer, e.g. type SN 74151 made by Texas Instruments, Inc. The multiplexer 44 functions to select one of the eight 12.5 nanosecond taps of the vernier digital delay line 42 in accordance with the vernier address signals $V_0$, $V_1$ and $V_2$.

As shown by FIG. 3, the tapped vernier digital delay line 42 is made up of fourteen digital inverters 161, 162, 163, 164, 165, 166, 167, 168, 169, 170, 171, 172, 173, and 174 which are connected in series. Each pair is selected to have an uninverted output and a propagation delay/transit time of 12.5 nanoseconds. Inverter circuits, type SN 7404, made by Texas Instruments, Inc., are used in the vernier delay line 42 of the present embodiment.

Figure 4A:
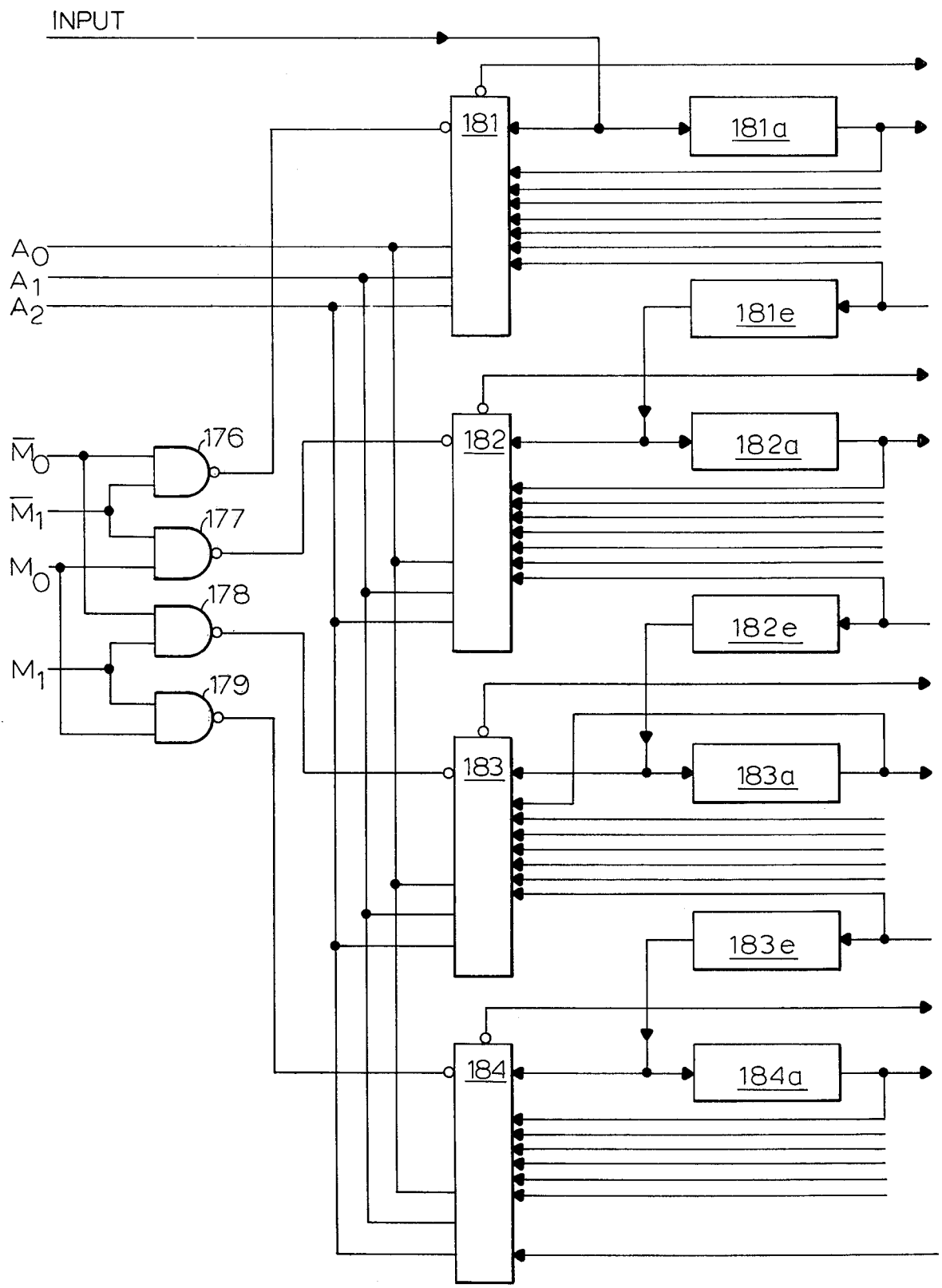
FIGS. 4A and 4B constitute a schematic block diagram of the main digital delay line circuit of the delay line subsystem of FIG. 1 and show the interconnection of 31 hundred-nanosecond digital delay cells which make up the main delay line.
Figure 4B:
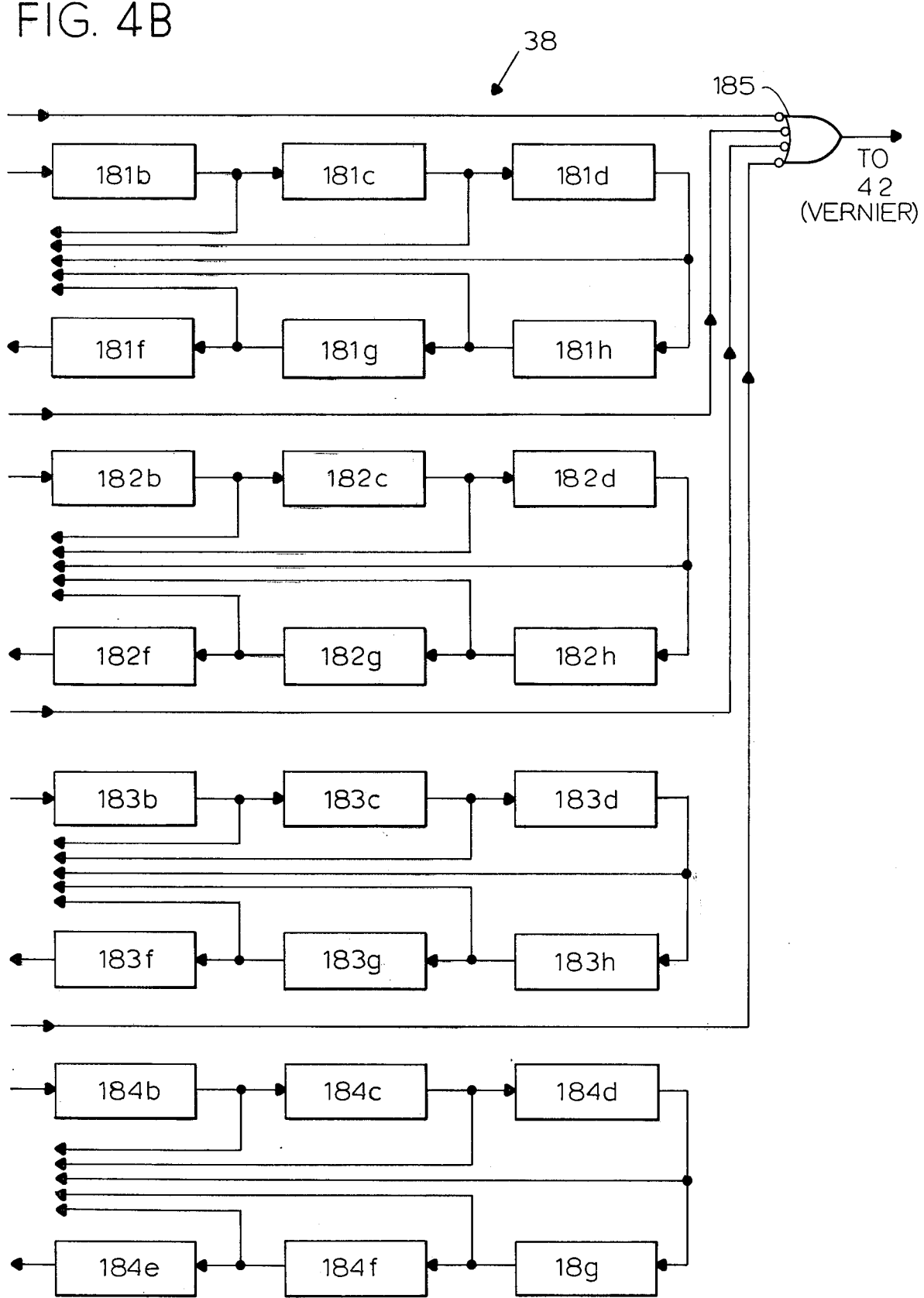

Turning to FIGS. 4A and 4B, the main tapped pulse delay line 38 and the rough tap selection multiplexer 40 will now be discussed. The latch output signals $M_0$, $\overline{M_0}$, $M_1$ and $\overline{M_1}$ are supplied to four two input NAND gates 176, 177, 178, 179 in accordance with the connection shown in FIG. 4A. These signals are associated with the counter's two bit positions above the lowest three positions. The output of the gate 176 goes to the enable(-strobe) input of a first multiplexer 181; the output of the gate 177 goes to the enable input of a second multiplexer 182; the output of the gate 178 goes to the enable input of a third multiplexer 183; and, the output of the gate 179 goes to the enable input of a fourth multiplexer 184. Each of the multiplexers 181, 182, 183, and 184 may be the same type as the multiplexer 44. Thus, the latch output signals $M_0$, $\overline{M_0}$, $M_1$ and $\overline{M_1}$ serve to select one of the four multiplexers 181, 182, 183, or 184. The latch outputs signals $A_0$, $A_1$, and $A_2$ are applied in parallel to the data select inputs of the multiplexers 181, 182, 183 and 184. They are associated with the counter's three highest order bit positions. Thus, the signals $A_0$, $A_1$ and $A_2$ function to select one of eight taps in each of the multiplexers 181, 182, 183, 184. The outputs of the multiplexers 181, 182, 183, 184 provide four inputs to a positive NAND gate 185 (FIG. 4B), the output of which goes to the input of the vernier delay line 42 (FIG. 3). Since only one multiplexer is enabled at a time, the gate serves as a multiplexer itself and its output is always unambiguous.

The main tapped digital delay line 38 of the preferred embodiment is made up of 31 identical digital delay elements which are connected in series. Each element provides 100 nanoseconds of delay. The undelayed input and the first seven elements 181a, 181b, 181c, 181d, 181f, 181g and 181h, are connected to the first multiplexer 181; the next eight elements 181e, 182a, 182b, 182c, 182d, 182f, 182g and 182h are connected to the second multiplexer 182; the third eight elements 182e, 183a, 183b, 183c, 183d, 183f, 183g and 183h are connected to the third multiplexer 183 and the remaining eight elements 183e, 184a, 184b, 184c 184d, 184e, 184f and 184g are connected to the fourth multiplexer 184. Thus, in combination, the four multiplexers 181, 182, 183, 184 are wired to select on command one of the 32 hundred nanosecond delay elements (including the undelayed input) in accordance with the latch signals received from the delay tap selector latch 46.

Figure 5:
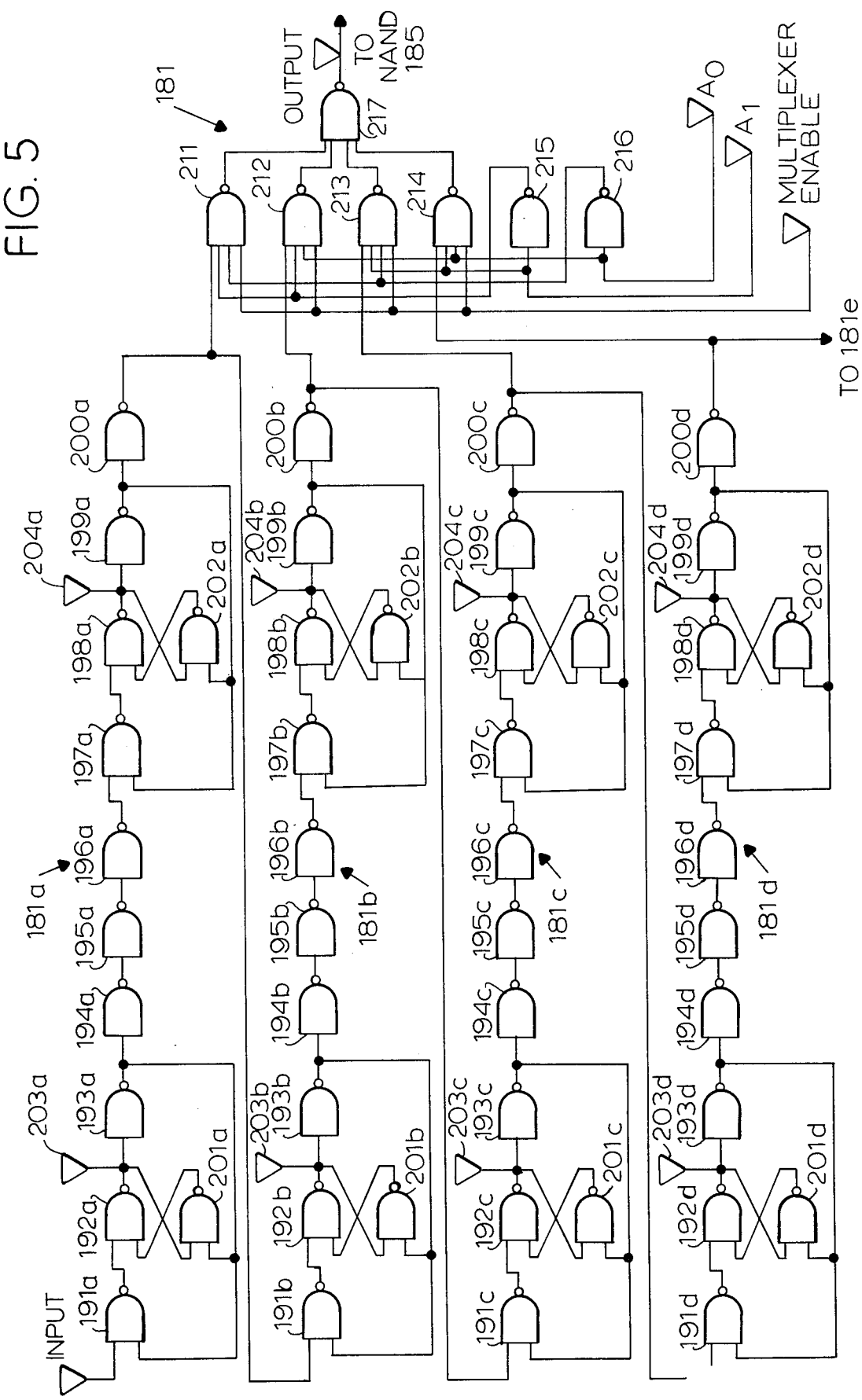
FIG. 5 is a schematic logic symbol diagram of four of the 31 interconnected hundred-nanosecond digital delay cells 2A and 2B with the associated multiplexer tap selector implementation shown by logic symbols.

The circuitry of the first four (181a, 181b, 181c, 181d) of the 31 identical dalay elements, along with a portion of the circuitry of the first multiplexer 181 is shown in detail in FIG. 5. Each delay element is made up of a series of digital NAND gates. Each gate may be one of the gates of a type e.g. SN 7400 made by Texas Instruments, Inc., or all of the gates shown in FIG. 5 may be fabricated as a single large scale integrated circuit chip. Thus the element 181a includes the series of gates 191a, 192a, 193a, 194a, 195a, 196a, 197a, 198a, 199a, 200a, 201a, and 202a. Each gate is selected to have a transit time or propagation delay of approximately 10 nanoseconds; thus, the ten gates 191a through 200a provide the 100 nanoseconds of required delay. A gate 201a is latch-connected with the gate 192a, and another gate 202a is latch-connected with the gate 198a. Gates 201a and 202a function to reconstitute each pulse travelling through the delay element 181a in order to overcome propagation losses. Two nodes 203a and 204a are provided for the purpose of adding external timing capacitance or resistance to calibrate the propagation delay of the element 181a to 100 nanoseconds. The description just given to the delay element 181a applied equally to the elements 181b, 181c and 181d which are illustrated in FIG. 5 as well as to the other 27 elements shown in FIGS. 4A and 4B; thus, it will not be repeated for them.

The portion of the first multiplexer 181 shown in FIG. 5 selects one of the delay elements 181a, 181b, 181c or 181d in accordance with the latch signals $A_0$ or $A_1$ ($A_2$ is not shown, but is required by the first multiplexer 181 to select one of all of the eight delay elements it governs). The latch signals $A_0$ $A_1$ along with the enable signal are applied to four element selector NAND gates 211, 212, 213 and 214. The output of delay element 181a provides a fourth input to a NAND gate 211; the output of element 181b provides a fourth input to a NAND gate 212, the output of element 181c provides a fourth input to a NAND gate 213, and the output of element 181d provides a fourth input to a NAND 214. Internal inverters 215 and 216 provide NOT $A_0$ ($\overline{A_0}$) signals to gates 211 and 213 and NOT $A_1$ ($\overline{A_1}$) signals to gates 211 and 212 respectively. An output gate 217 provides one of the four inputs to the main delay line output NAND gate 185.

It should be noted that inverter 200d provides an output that bypasses the multiplexer and provides for the unobstructed propagation of the pulse train to subsequent delay elements even when the present multiplexer is not enabled. This is the means by which the entire delay line is cascaded.

OUTPUT SUBSYSTEM 48

As previously mentioned, the output subsystem includes a frequency divider 50 and a phase selector 52 (FIG. 1). In the preferred embodiment the frequency divider 50 is shown as a divide-by-two D flip flop 50 (FIG. 3) which is toggled by the digital output from the fine tap selection multiplexer 44. The divider 50 thereby reconstructs the received signal to restore the amplitude limited FM signal (waveform N, FIG. 6) format received at the input of the corrector 10. A buffer inverter 51 amplifies and inverts the output signal from the flip flop 50. The buffer 51 is selected to provide a suitable output impedance for driving an output line. A series resistor 53 may be used in series with the output of the buffer 51 to provide the required output impedance.

The phase shifter 52 may be within the corrector 10 or it may be external. The circuitry of the 180° phase shifter 52 is not shown as it employs conventional, well known principles to restore the correct phase to the corrected output signal.

OPERATION

Referring to FIG. 1 amplitude limited FM video information is applied to the edge detector and pulse former 14 of the input subsystem 12 to provide an output pulse train of about 20 nanosecond wide pulses, the leading edges of which carry all of the video information. These converted pulses then enter into the fixed predelay circuit 36 and are delayed by approximately 700 nanoseconds. During this 700 nanosecond delay, the formed pulse train from the edge detector and pulse former 14 is demodulated by the demodulator to restore composite direct video which is equalized by the equalizer 20. Thereafter the synchronizing pulses are detected and separated from other video information and are then passed to the time base error measurement control circuit 28 to provide a counter stop signal for the high speed counter 30. The time required for the line of video information to pass through the demodulator 18, equalizer 20, sync stripper 22, sync window 24, and into the time base error measurement control 28 is the same as the time required for the signal to pass through the predelay circuit 36: about 700 nanoseconds. It may be shorter than the latter, but not longer as this would shorten the usable range of the line.

At the same time, the flywheel oscillator 26 is loosely locked at the horizontal sync rate by the phase lock loop circuitry shown in FIGS. 2A and 2B so that the flywheel oscillator 26 provides control signal corresponding to the average horizontal line sync and phase. This control signal is supplied to the time base error measurement control circuit 28 to provide a counter enable signal which starts the high speed digital counter counting.

The main tapped digital delay line 38 of the present invention provides for a total of 3.1 microseconds of delay, and the vernier pulse delay line 42 provides the additional 100 nanoseconds, for a total 3.2 microseconds delay line. The high speed measurement counter 30 contains 256 combinations which corresponds to the 256 delay taps provided by the main tapped digital delay line 38 combined with one vernier line 42. At the control signal from the flywheel oscillator 26, the high speed 80 megahertz counter 30 begins to count taps along the delay lines 38 and 42. The counter is stopped by the arrival of the leading edge of the actual incoming horizontal sync pulse as received at the time base error measurement control 28. The count reached by the counter 30 corresponds to the arrival time of the incoming video line while it simultaneously selects the appropriate tap to correct a time base error, if any. After the counter 30 has settled, the count is strobed into the delay tap selector latch 46 by a signal from the time base error measurement control 28. The latch strobe signal is timed to occur during the front porch portion of the horizontal sync interval so that it does not interfere with either the horizontal sync pulse or with video information so that it may be readily suppressed by suitable circuitry. Tap switch transients are illustrated as iregularly timed impulses in waveform M, and irregular pulses in waveform N. The switching transient is illustrated in waveform O of FIG. 6 as occurring during the front porch position of the horizontal sync interval. In such position it may readily be suppressed. In other positions it would interfere with the picture or synchronization.

If there is no time base error, the counter reading will be 128 in binary which indicates the midpoint of the 3.2 microsecond delay line and which provides the 1.6 microsecond delay needed to account for the 1.6 microsecond advance of the reference signal from the flywheel oscillator 26. If the count is less than 128 (which means that the leading edge of the incoming horizontal sync pulse came sooner than expected and more delay is needed for correction) a tap closer to the end of the delay line than the midpoint will be selected. If the count is greater than 128 (which would indicate that the leading edge of the incoming horizontal sync pulse was late and that less delay is needed for correction) a tap closer to the beginning of the delay line will be selected. Once the taps on the main tap digital delay line 38 and the vernier delay line 42 have been made, they remain in place for the duration of the passage of the incoming television line of video through the delay 34 and output 48 subsystem. During this passage, and in particular during the front porch at the end of said line, the delay needed for the next video line will be counted by the counter 30 in the manner aforesaid.

In the embodiment shown in FIG. 1, the line of video leaves the fixed predelay circuit 36, passes through the main tapped digital delay line 38 and exits therefrom at the tap selected, enters the rough tap selection multiplexer 40 and exits therefrom, to the vernier pulse delay line 42 and exits therefrom via the tap selected. The line of video then passes through the fine selector multiplexer 44 and into the frequency divider 50 where the line of video is reconstructed into limited FM wherein the time base error has been corrected. A phase selector 52 provides the correct phase relationship of the final signal.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A system for correcting high speed time base errors of pulse trains, each having a detectable beginning, and recurring at a predetermined time base wherein all information is carried upon the leading edges of the pulses of each said train, said system including in combination:

tapped delay line means connected to receive said pulse trains for delaying said trains for periodically reconstituting each pulse of each said train during delaying passage therethrough and having randomly selectable outputs; p1 detector means connected at the input of said system for detecting the beginning of each said pulse train;

timing means for generating a counting signal having counts corresponding to increments of delay between adjacent outputs of said delay line means;

digital counter means connected to said timing means for counting said counting signal;

counter control means connected to said counter means and to said detector means for generating as a time base, an average time of arrival of pulse train beginning from detected beginnings of multiple pulse trains and for enabling said counter means to count for each said pulse train the counts of said counting signal during an interval having a duration which is related to the difference between the actual time of arrival of the beginning of a said pulse train and said generated time base;

delay line control means connected to said delay line means and to said counter means for selecting for each of said pulse trains one of said outputs of said delay line means in accordance with said count, said output being randomly selected in accordance with said count to provide delay which will compensate for the difference between actual and expected arrival of the beginning of said pulse train, said delay line control means including latch means for holding the selection of said output until said pulse train has passed through said selected output of said delay line means.

2. The system set forth in claim 1 additionally comprising counter overflow control means connected to said digital counter means for stopping said counter means from counting before its count exceeds the delay capacity of said tapped delay line means.

3. The system set forth in claim 1 wherein said tapped delay line means comprises plural cascaded digital gates having propagation delays providing said increments of delay, and wherein some predetermined gates of said cascade are connected to said delay line control means to provide said randomly selectable outputs and wherein at least one other predetermined gate of said cascade comprises a latch for reconstituting each pulse of each said pulse train passing therethrough.

4. The system set forth in claim 1 wherein said counter control means includes interval control means for controlling the duration of said interval to provide a count corresponding to the midpoint of tapped delay of said tapped daily line means when a said group which has no time base error is counted.

5. A video time base error corrector for connecting horizontal lines of video having time base errors in a video signal in a frequency modulated, pulse train format wherein leading edges of pulses carry said video signal including in combination:

detector means connected at the input of said corrector for detecting the actual time of occurrence of the horizontal synchronizing pulse of each line of video prior to its passage through said corrector;

counter control means connected to said detector means for producing an average time base from multiple incoming detected horizontal synchronizing pulses and for producing a counter enable signal corresponding to the time difference between said average time base signal and the detected horizontal synchronizing pulse of each said incoming video line having a time base error;

tapped digital delay line means connected to receive each said pulse train and having randomly selectable output taps between predetermined increments of delay said delay line means for compensating for a said time difference for each said horizontal line and for periodically reconstituting each pulse of each said train during its passage therethrough;

digital counter means connected to said counter control means for counting a counting signal for the duration of said counter enable signal to provide a tap selection count;

timing means connected to said digital counter means for generating said counting signal wherein each count corresponds to an increment of delay of said delay line means; and output control means connected to said delay line means and to said counter means for selecting one of said outputs in accordance with said count, said output being selected to provide a delay which will correct the time base error of said line of video being the counted time difference between average time base and time of arrival of said horizontal synchronizing pulse of said line being corrected, said output control means including latch means for holding the selection of said output until said line of video undergoing time base correction has passed through said selected output; and binary frequency divider means connected to said output control means for converting each pulse train carrying said corrected video line to a limited frequency modulation signal format.

6. The corrector of claim 5 additionally comprising overflow control means connected to said digital counter means for terminating the counting thereof so that said tap selection count does not exceed the number of outputs of said tapped digital delay line means.

7. The corrector of claim 5 wherein said counter control means includes a phase locked loop operating at the horizontal line frequency and locked loosely to horizontal synchronizing pulses detected by said detector means to provide as said average time base signal an average of a substantial number of said detected horizontal line synchronizing pulses.

8. The corrector of claim 7 additionally comprising fixed predelay means connected before said tapped digital delay line means for delaying the transit of each said pulse train for a said video line by a fixed predetermined time sufficient to enable said horizontal line synchronizing pulse to be detected and said tap selection count to be made and output tap selected before a video portion of said video line enters said tapped digital delay line means.

9. The corrector of claim 5 wherein said tapped digital delay line means comprises plural cascaded digital gates having propagation delays which provide known increments of delay, and wherein predetermined gates of said cascade are connected to said output control means to provide said selected outputs.

10. The corrector of claim 9 wherein said tapped digital delay line means additionally comprises at least one of said gates being configured as one half of a symmetrical flip flop with a companion gate for regenerating said impulses during passage through said delay line means.

11. A method of correcting time base errors occurring in recurrent impulse trains carrying information on the leading edges of the impulses thereof and wherein each said train has a detectable beginning, said method comprising the steps of:

detecting the actual time of arrival of the beginning of each said impulse train;

generating as a time base an average expected time of arrival of beginning by averaging over multiple recurrent trains;

passing a said train through a digital delay line having a plurality which periodically regenerates each passing pulse;

digitally counting the difference in time between actual time of arrival and expected time of arrival of the beginning of each said train, the count thus reached being a measure of the time base error wherein each count unit corresponds to a tap of said delay line;

for each said train, selecting a tap of said delay line with said digit count; and outputting said train from said delay line via said selected tap to thereby correct any time base error.

12. A method correcting time base errors in horizontal lines of a video signal comprising the steps of:

translating an incoming horizontal line of video in limited frequency modulation signal format into a train of impulses of fixed width wherein the leading edges thereof carry said video line;

detecting actual occurrence of the horizontal synchronizing pulse of said video line having time base error;

generating a reference signal at a correct horizontal line time base by averaging times of arrival of multiple horizontal synchronizing pulses;

producing a count enable signal which corresponds to the time difference between said reference signal and the time of arrival of said horizontal synchronizing pulse of said video line to be corrected;

counting a counting signal during the duration of said count enable signal to provide a tap selection count;

selecting a tap of a delay line having a predetermined number of taps spaced along the length thereof with said tap selection signal;

passing said impulse train through a portion of said delay line between its entrance and said selected tap to correct the time base errors of said train;

regenerating each impulse of said pulse train by said delay line at at least one predetermined location in said selected portion thereof;

holding the selection of said tap until said train has passed through said tap; and restoring limited frequency modulation signal format to said line of video from said time base corrected pulse train after it has passed through said tap.

13. The method of claim 12 additionally comprising the step of stopping said counting before said tap selection count exceeds the number of taps of said delay line.

14. A time base error corrector for periodically recurring high speed frequency modulated pulse trains having a detectable beginning wherein all information is carried upon leading edges of the pulses of the trains, said corrector comprising:

an input and an output;

a demodulator connected at said input for demodulating said pulse trains to recover said information;

a pulse train beginning separator connected to said demodulator for separating detected pulse train beginnings from the rest of said information;

a flywheel oscillator oscillating to provide an average time of recurrence of said beginnings, said oscillator being free running yet coupled to said separator and responsive to actual time of arrival of each beginning to provide said average time;

a time base error measurement control circuit connected to said separator and to said flywheel oscillator for generating a counter enable signal having a duration related to the time base error of a said train which is the time difference between an actual time of occurrence of a said detected beginning and said average time, and for generating a latch signal;

a stabilized reference oscillator for providing counting pulses having a predetermined period;

a high speed multiple stage ripple counter connected to said reference oscillator and to said measurement control circuit, said counter for counting the number of pulses received from said reference oscillator during the duration of said enable signal;

a multiple stage latch circuit connected to said measurement control circuit to receive said latch signal, each stage of said latch circuit being connected to a stage of said ripple counter to store the count thereof;

a tapped digital delay line of multiple stages between taps of plural cascaded digital gates, each stage having a period of delay substantially equivalent to the period of said reference oscillator, and wherein at least one of said stages includes pulse reconstitution means for reconstituting each pulse of each pulse train passing through said delay line;

a multiplexer circuit connected to said latch circuit and to each tap of said delay line, said multiplexer circuit for selecting and electrically connecting to a said tap of said line corresponding to the count stored in said latch, said multiplexer providing said output, being said connection to said selected tap for the pulse train having the time base error of said train; and a fixed predelay circuit connected between said input and said delay line, said predelay circuit providing a predelay related to a time period required by said corrector to arrive at a said tap selection for each said pulse train.

15. The corrector set forth in claim 14 wherein said delay line includes a main delay line and a vernier delay line and wherein some low order stages of said latch are connected to said multiplexer circuit to control said vernier delay line and wherein other remaining stages of said latch are connected to said multiplexer circuit to control said main delay line.

16. The corrector set forth in claim 14 further including a frequency divider connected between said multiplexer circuit and said output.

17. A system for correcting high speed time base errors of information groups, each having a detectable beginning, and recurring at a predetermined time base, said system including in combination:

tapped delay line means connected to receive said information groups for delaying said groups and having randomly selectable outputs;

detector means connected at the input of said system for detecting the beginning of each said information group;

timing means for generating a counting signal having counts corresponding to increments of delay between adjacent outputs of said delay line means;

digital counter means connected to said timing means for counting said counting signal;

counter control means connected to said counter means and to said detector means for generating as a time base, an average time of arrival of information group, beginning from detected beginnings of multiple information groups and for enabling said counter means to count for each said group the counts of said counting signal during an interval having a duration which is related to the difference between the actual time of arrival of the beginning of a said group and said generated time base;

counter overflow control means connected to said digital counter means for stopping said counter means from counting before its count exceeds the delay capacity of said tapped delay line means;

delay line control means connected to said delay line means and to said counter means for selecting for each of said information groups one of said outputs of said delay line means in accordance with said count, said output being selected to provide delay which will compensate for the difference between actual and expected arrival of the beginning of said information group, said control means including latch means for holding the selection of said output until said group has passed through said selected output of said delay line means.

18. A system for correcting high speed time base errors of information groups, each having a detectable beginning, and recurring at a predetermined time base, said system including in combination:

tapped delay line means connected to receive said information groups for delaying said groups and having randomly selectable outputs;

detector means connected at the input of said system for detecting the beginning of each said information group;

timing means for generating a counting signal having counts corresponding to increments of delay between adjacent outputs of said delay line means;

digital counter means connected to said timing means for counting said counting signal;

counter control means connected to said counter means and to said detector means for generating as a time base, an average time of arrival of information groups beginning from detected beginnings of multiple information groups and for enabling said counter means to count for each said group the counts of said counting signal during an interval having a duration which is related to the difference between the actual time of arrival of the beginning of a said group and said generated time base;

said counter control means including interval control means for controlling the duration of said interval to provide a count corresponding to the midpoint of tapped delay of said tapped delay line means when a said group which has no time base error is counted;

delay line control means connected to said delay line means and to said counter means for selecting for each of said information groups one of said outputs of said delay line means in accordance with said count, said output being selected to provide delay which will compensate for the difference between actual and expected arrival of the beginning of said information group, said control means including latch means for holding the selection of said output until said group has passed through said selected output of said delay line means.

19. A video time base error corrector for correcting horizontal lines of video having time base errors in a video signal in a frequency modulated, pulse train format wherein leading edges of pulses carry said video signal, including in combination:

detector means connected at the input of said corrector for detecting the actual time of occurrence of the horizontal synchronizing pulse of each incoming line of video;

counter control means connected to said detector means for producing an average time base from multiple incoming detected horizontal synchronizing pulses and for producing a counter enable signal corresponding to the time difference between said average time base signal and the detected horizontal synchronizing pulse of a said incoming video line;

tapped digital delay line means connected to receive each said pulse train and having selectable outputs between predetermined increments of delay;

digital counter means connected to said counter control means for counting a counting signal for the duration of said counter enable signal to provide a tap selector count;

timing means connected to said digital counter means for generating said counting signal wherein each count corresponds to an increment of delay of said delay line means;

overflow control means connected to said digital counter means for terminating the counting thereof so that said tap selection count does not exceed the number of outputs of said tapped digital delay line means;

output control means connected to said delay line means and to said counter means for selecting one of said outputs in accordance with said count, said output being selected to provide a delay which will correct the time base error of said line of video being the counted time difference between average time base and time of arrival of a said horizontal synchronizing pulse of said line being corrected, said output control means including latch means for holding the selection of said output until said line of video undergoing time base correction has passed through said selected output; and binary frequency divider means connected to said output control means for converting each pulse train carrying said corrected video line to a limited frequency modulation signal format.

20. A system for correcting high speed time base errors of pulse trains, each train having a detectable beginning, and recurring at a predetermined rate wherein all information is carried in the time relationship between similar transitions of successive pulses of each train, said system including in combination:

a tapped delay line including a segment of tandem connected active circuit elements, each element providing a predetermined time delay in response to a said transition of each pulse of each said train, said delay line having an input connected to receive said pulse trains and having randomly selectable outputs with each said output being related to a said element of said segment of the line;

detector means connected at the input of said system for detecting the beginning of each said pulse train;

timing means for generating a counting signal having counts corresponding to increments of delay between adjacent outputs of said delay line means;

digital counter means connected to said timing means for counting said counting signal;

counter control means connected to said counter means and to said detector means for generating a reference time base by averaging the times of arrival of the detected beginnings of consecutive multiple pulse trains and for enabling said counter means to count for each said pulse train the counts of said counting signal during an interval having a duration which is related to the difference between the actual time of arrival of the beginning of a said pulse train and said generated reference time base;

delay line control means connected to the outputs of said delay line and to said counter means for selecting for each of said pulse trains one of said outputs in accordance with said count, said output being randomly selected in accordance with said count to provide a delay which will compensate for the difference between actual and expected arrival of the beginning of said pulse train, said control means including latch means for holding the selection of said output until said pulse train has passed through said selected output of said delay line, whereupon another output is then randomly selected to compensate for time base error of the next succeeding pulse train.

* * * * *

UNITED STATES PATENT AND TRADEMARK OFFICE
CERTIFICATE OF CORRECTION

PATENT NO. : 4,118,738
DATED : October 3, 1978
INVENTOR(S) : WALTER ARNSTEIN

It is certified that error appears in the above-identified patent and that said Letters Patent are hereby corrected as shown below:

Col. 11, line 18, "dalay" should read --delay--;

Col. 11, line 57, "NOT $A_0$ $(A_0)$" should read --NOT $A_0$ $(\overline{A_0})$--;

Col. 11, line 58, "NOT $A_1$ $(A_1)$" should read ---NOT $A_1$ $(\overline{A_1})$--;

Col. 14, line 3, after "selectable outputs;" delete "pl";

Col. 16, line 12, after "a plurality" insert --of taps--.

Signed and Sealed this

Third Day of April 1979

[SEAL]

Attest:

RUTH C. MASON
Attesting Officer

DONALD W. BANNER
Commissioner of Patents and Trademarks